(12) United States Patent
Simonich et al.

(10) Patent No.: US 6,301,665 B1
(45) Date of Patent: Oct. 9, 2001

(54) SECURITY METHODOLOGY FOR DEVICES HAVING PLUG AND PLAY CAPABILITIES

(75) Inventors: Christopher E. Simonich, Hillsboro, OR (US); Robin T. Tran, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/070,457

(22) Filed: Apr. 30, 1998

(51) Int. Cl.$^7$ ..................................................... G06F 12/14
(52) U.S. Cl. ............................................................. 713/200
(58) Field of Search ..................................... 713/200, 202, 713/201; 380/201, 202; 340/825.31, 825.34

(56) References Cited

U.S. PATENT DOCUMENTS

| | | | |
|---|---|---|---|
| 3,890,601 | 6/1975 | Pietrolewicz | 340/172.5 |
| 4,942,606 | 7/1990 | Kaiser et al. | 380/4 |
| 4,959,860 | 9/1990 | Watters et al. | 380/4 |
| 5,173,940 | 12/1992 | Lantz et al. | 380/25 |
| 5,375,243 | 12/1994 | Parzych et al. | 395/725 |
| 5,377,343 | * 12/1994 | Yaezawa | 711/164 |
| 5,388,156 | 2/1995 | Blackledge | 380/4 |
| 5,451,934 | 9/1995 | Dawson | 340/825.31 |
| 5,469,556 | * 11/1995 | Clifton | 711/163 |
| 5,533,125 | 7/1996 | Bensimon | 380/4 |
| 5,640,373 | * 6/1997 | Davis | 368/156 |
| 5,649,159 | * 7/1997 | Le et al. | 711/163 |
| 5,687,379 | * 11/1997 | Smith et al. | 710/200 |
| 5,778,199 | * 7/1998 | Wanner et al. | 710/107 |
| 5,887,131 | * 3/1999 | Angelo | 713/202 |
| 5,946,672 | * 8/1999 | Chrosny et al. | 705/410 |
| 5,963,142 | * 10/1999 | Zinsky et al. | 340/825.34 |

FOREIGN PATENT DOCUMENTS 2154344A 9/1985 (GB) .

OTHER PUBLICATIONS

Compaq Deskpro/M Reference Guide, pp. 5–1 Through 5–13.

Disklock Advertisement, PC Magazine, vol. 10, No. 11,Jun. 11, 1991; New York, N.Y.; p. 139.

Fastlock User's Manual, Version 1.0, Rupp Corp., New York, N.Y.

Compaq Computer Corp., Phoenix Technologies Ltd., Intel Corporation, "Preliminary Plug and Play Bios Specification, Version 1.0A," Mar. 10, 1994, pp. 4–18, 20–27, 38, 40–43, 46.

Plug and Play ISA Specification, Version 1.09, May 5, 1994, pp. 4–12, 14–25, 27–28, 52–53, 60–62 & 64.

National Semiconductor, PC87308VUL Super I/O . . . Parallel Port, pp. i–xx, 1–50 & 160–164, Jul. 1996.

\* cited by examiner

*Primary Examiner*—James P. Trammell
*Assistant Examiner*—P. Elisca
(74) *Attorney, Agent, or Firm*—Akin, Gump, Strauss, Hauer & Feld, LLP

(57) ABSTRACT

A security methodology and security logic for protecting Plug and Play computer system components from unauthorized access. The security logic prevents modification of the base addresses of specified Plug and Play computer system components by blocking writes to specific index locations programmed into security registers. In the disclosed embodiment of the invention, the base address of a Super I/O chip is protected, as well as the base addresses of specified logical devices in the Super I/O chip. Protecting the base addresses in this manner prevents the security logic from being circumvented by interfering with the address decoding used to track reads and writes to protected index registers. In addition, the security registers are programmed to prevent access to the protected index registers of the logical devices.

25 Claims, 10 Drawing Sheets

SECURITY METHODOLOGY FOR DEVICES HAVING PLUG AND PLAY CAPABILITIES

BACKGROUND OF THE INVENTION

1. Field of the Invention

This invention relates to security and personal computer systems, and more particularly to a method for extending computer security features to devices having Plug and Play capabilities.

2. Description of the Related Art

The prevention of data theft is extremely important in computer systems designed to exist on corporate networks as well as home computers. Companies and individuals spend large sums of time and money developing data that resides in these systems. Adequately protecting a computer system's resources from unauthorized access is thus a primary concern of computer users.

To address various security issues, including protection of system ROM and other memory locations, a security device was developed as described in commonly-assigned U.S. patent application Ser. No. 081779,061, entitled "SECURITY CONTROL FOR PERSONAL COMPUTE," which is hereby incorporated by reference for all purposes as if set forth in its entirety. The security device described therein provides a secure method for access to different system resources, and was capable of preventing data transfer via externally accessible channels by turning off common system devices such as the parallel port, the serial port(s), the floppy disk controller, etc. The logic for all of these devices as well as other logical devices normally exists within a computer system's "Super I/O" chip or similar device. The Super I/O chip provides a mechanism to disable the various logical devices via one or more configuration registers.

Merely turning off system devices, however, is not sufficient protection. To make a system more secure, it is necessary that the devices cannot be turned back on by an unauthorized user. In current systems, security logic is used to block ISA bus read and/or write cycles to the registers in the Super I/O chip responsible for turning system devices on or off. The ISA cycles are blocked by gating an address enable signal AEN and/or I/O write control IOWC# signal of the Super I/O chip. Unauthorized cycles to the Super I/O chip are blocked when the security logic decodes and I/O address for the Super I/O chip and the user has set what amounts to a blocking enable bit.

In prior systems, security logic in the security device protected certain ranges of non-volatile CMOS RAM within the Real-Time Clock (RTC) in the Super I/O chip. The protected locations are used to store passwords and other critical information. For example, assume that the I/O Index register address of the RTC is 0070h and the address of the Data register is 0071h. The prior security logic would work by blocking reads or writes to address 0071h when the Index, tracked by examining writes to the address 0071h, was in a predetermined range of indices to be protected. Reads and writes would be blocked by holding the I/O write control signal IOWC# or address enable signal AEN to a logic high level when the value of 0070h (the Index register address) was in the range of an Index containing sensitive information.

The security device operates by providing multiple hardware "lock" signals capable of being toggled by the user. The lock signals restrict access to specific system resources when asserted. In general, a user enters a password for a particular memory "slot" in the security device. The memory slot is then placed in a "protected" state by issuing a PROTECT RESOURCES command to the security device. While in the locked state, a lock signal is asserted, which secures system resources. To unlock the slot, the user issues an ACCESS RESOURCE command to the security device, followed by entry of the correct password. Correctly entering a slot's password changes the state of the slot to "unprotected." The security device password may only be written if the slot is in the unprotected state. The security device can only verify and does not divulge the password, thereby enhancing the security of the system. Providing computer security is not a static process, however, as technology and new threats to security continue to develop at a rapid pace.

For example, the owners of today's personal computers (PCs) are faced with a myriad of options when choosing peripheral devices. Frequently, computer users decide to upgrade or expand the capabilities of their computer systems rather than buying an entirely new system. In the past, installing new hardware was frequently a time-consuming and frustrating process, requiring the computer user to become familiar with architectural components such as direct memory access (DMA) and various system interrupts (IRQs). Manipulation of various parameters was often required in order to ensure that its newly added components did not conflict with existing components.

Against this backdrop, a number of hardware and software manufacturers undertook an initiative to solve these dilemmas by creating the so-called Plug and Play (PnP) specification. Plug and Play is the industry term for the technology that allows a computer system to understand a user's intentions to install option cards, for example, a sound card, into the computer system and automatically configure it. This allows new options to work immediately following installation without disrupting existing system components. When a new option card is installed, Plug and Play firmware automatically figures the computer system's bus and sets key technology parameters for Plug and Play-ready add-in cards. Previously, users had to set these parameters manually, a complex and problematic exercise. When combined with features in certain operating systems, such as Windows 95, Plug and Play greatly simplifies the process of setting up a personal computer system.

Following the boot process, an operating system incorporating Plug and Play support retrieves Plug and Play information gathered by the BIOS. System resources are then allocated amongst the Plug and Play cards. Conflict-free resources for all inactive logical devices are also allocated. All logical devices that have been configured are activated, and device drivers are loaded. Details of Plug and Play configuration are generally known or available to those skilled in the art Adding Plug and Play capabilities to the Super I/O chip may create additional security concerns. Specifically, the ISA Plug and Play architecture allows a given chip to contain several "logical devices." It does this by allowing each logical device to have its own base address. The given chip decodes all addresses for its logical devices.

When the RTC located within the Super I/O chip becomes a Plug and Play logical device whose base address can change, prior security devices may not adequately protect the contents of the RTC. For example, an unauthorized user could conceivably modify the base address of the RTC, and then gain access to unprotected Indexed locations. Other logical devices of the Super I/O chip, such as power management logic, may also have base I/O addresses capable of being modified. Further, the base address of the Super I/O chip itself may be modified in an attempt to circumvent security measures.

SUMMARY OF THE INVENTION

Briefly, the present invention provides a security methodology and security logic for protecting certain Plug and Play computer system components from unauthorized access. The security logic utilizes address enable and read/write control signals to the Super I/O chip to prevent access to specific index registers corresponding to specified logical devices. The security logic also protects the base addresses of the Super I/O chip as well as the base addresses of specified logical devices. Protecting the base addresses prevents the security logic from being circumvented by interfering with the address decoding used to track reads and writes to protected index registers.

In order to protect the base address of the Super I/O chip, a specific index register in the index register set of the Super I/O chip is monitored. Following a Plug-and-Play boot process, this index register, which governs the base address of the Super I/O chip, may be changed. In order to prevent this, security logic in accordance with the invention provides the option to block write cycles to this index register. Such blocking prevents a user from changing the base address of the Super I/O chip.

Next, with the base address of the Super I/O chip secured, the base addresses of logical devices of interest are secured. In the Super I/O chip, the base address of a logical device is changed by selecting a logical device number via a Super I/O index (e.g., 07h), and then programming a 16 bit ISA bus base address into additional indexes (e.g., 60/61h). To prevent such an occurrence, security logic according to the invention monitors the current Super I/O chip index by decoding the Super I/O chip's base address (Index register). When 07h is in the Index register, the security logic latches writes to the Super I/O chip's corresponding Data register. In the disclosed embodiment of the invention, the Real Time Clock (RTC) and the Power Management logic of the Super I/O chip comprise two protected logical devices If the current logical device number matches either the logical device number of the RTC or the Power Management, accesses to indexes 60/61h are blocked, thus protecting the base addresses of these logical devices. The logical device number of the RTC and the Power Management Block are programmable in the register space of the security logic.

In addition to protection of base addresses, the security logic according to the present invention also allows for protection of individual indexes for each of the protected logical devices. The Super I/O chip provides a separate index register set for operation of each of the logical devices. Protection of individual indexes within these additional index register sets allows for specific functionality within each logic device to be protected.

For example, the nonvolatile RAM located in the RTC is used for system password storage. The security logic provides programmable registers to designate ranges of the RTC index register space as protected ranges. These ranges may be used to store passwords such as an administrator password and a power-on password. When programmed with a base address of the RTC (allowing for tracking of indexes as described above), the security logic prevents accesses to these indexes when enabled.

Likewise, the security logic also provides the ability to protect indexes in the Power Management logical device. One of the Power Management indexes contains a function enable register. This register allows the user to enable/disable all of the data transfer devices in the Super I/O chip. These devices include a floppy controller, a parallel port, serial ports, and an infra-red port. This register is protected to prevent an unauthorized user from enabling a previously disabled data transfer device.

Thus, the present invention permits system security measures to be extended to devices incorporating features such as Plug and Play compatibility.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

Commonly-assigned U.S. patent application Ser. No. 09/070,458, entitled "METHOD AND APPARATUS FOR PROVIDING REMOTE ACCESS TO SECURITY FEATURES ON A COMPUTER NETWORK", is hereby incorporated by reference as if set forth in its entirety.

Computer System Overview

Figure 1:
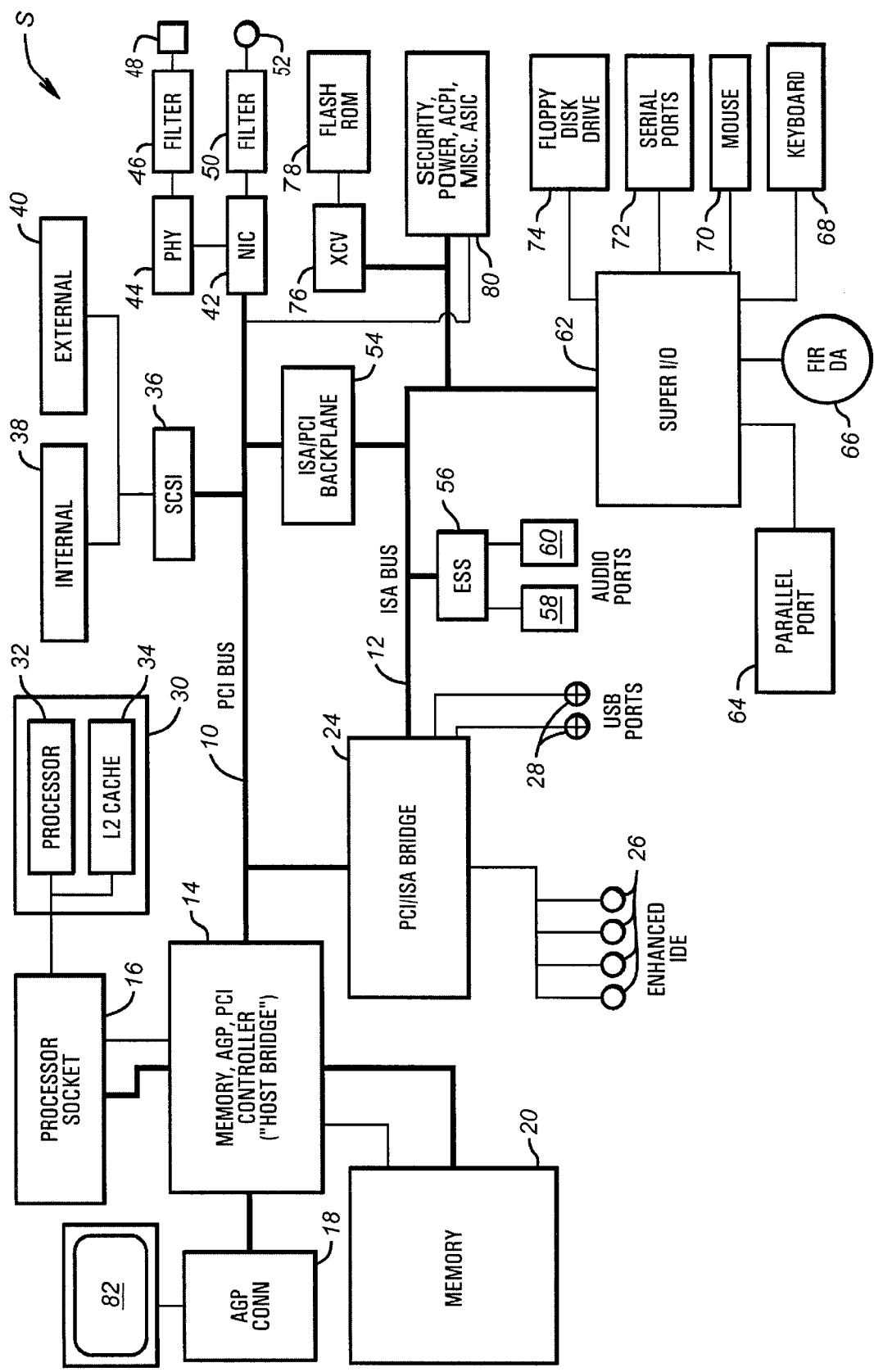
FIG. 1 is a block diagram of a computer system incorporating security features in accordance with the present invention.

Turning first to FIG. 1, a typical computer system S implemented according to the invention is illustrated. While this system is illustrative of one embodiment of the invention, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18 and a memory subsystem 20.

A second bridge circuit, a PCI/ISA bridge 24 (the "ISA bridge") bridges between the PCI bus 10 and the ISA bus 12.

The host bridge 14 in the disclosed embodiment is a 252LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed ISA bridge 14 includes interface circuitry for the AGP connector 18 and the memory subsystem 20. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with processors other than the Pentium II without detracting from the spirit of the invention.

The host bridge 14, when the Intel 440LX North Bridge is employed, supports extended data out (EDO) dynamic random access memory (DRAM and synchronous DRAM (SDRAM), a 64/72-bit data path memory, a maximum memory capacity of one gigabyte, dual inline memory module (DIMM), serial presence detect, eight row address strobe (RAS) lines, error correcting code ECC) with single and multiple bit error detection, read-around-write with host for PCI reads, and 3.3 volt DRAMs. The host bridge 14 support up to 66 megahertz DRAMs, whereas the processor socket 16 can support various integral and non-integral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes fill clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52. The NIC 42 allows information such as passwords and other data to be received and provided by the computer system S.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a Flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system as set forth in greater detail below. The ASIC 80 includes security features and security logic (FIG. 2) according to the present invention, system power control, light emitting diode (LED) control, a PCI arbiter, remote wake up logic, system fin control, hood lock control, ACPI registers and support, system temperature control, and various glue logic. Finally, a video display 82 can be coupled to the AGP connector 18 for display of data by the computer system S.

Again, a wide variety of systems could be used instead of the disclosed system S without departing from the spirit of the invention.

Figure 2:
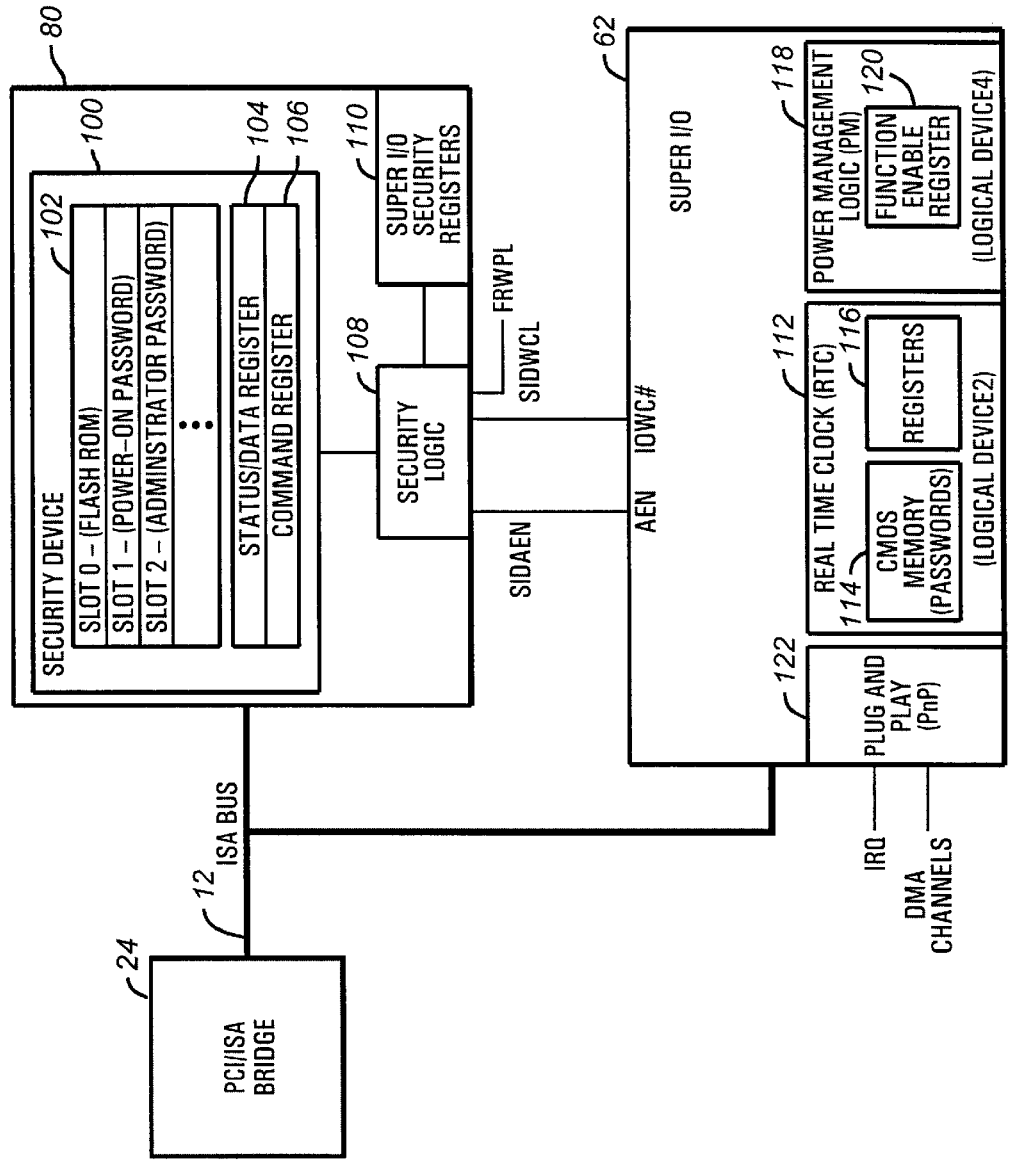
FIG. 2 is a block diagram detailing specific portions of the computer system of FIG. 1.

Referring now to FIG. 2, a block diagram detailing specific portions of the computer system S of FIG. 1 is provided. The ASIC 80 contains a security device 100 for securely maintaining various passwords (in the slots 102), although the security device 100 could be implemented in other system components. The preferred embodiment of the security device 100 comprises the following elements: a plurality of memory slots 102 to store passwords for protected resources; a command register 106 for the security device 100; and a status/data register 104 for communicating with the computer system S. These components allow a user key information to be compared to the passwords stored in the memory slots.

The comparison process may be carried out by logic internal to the security device 100, or by other related or closely coupled logic such as security logic 108. The precise configuration of the logic used in the comparison process is not considered critical to the invention. However, the contents of the memory slots 102 should not be ascertainable during the comparison process. Exemplary operation of the security logic 108 and protection of the memory slots is described in the previously-incorporated U.S. Patent Application entitled "METHOD AND APPARATUS FOR PROVIDING REMOTE ACCESS TO SECURITY FEATURES ON A COMPUTER NETWORK".

The Super I/O chip 62 supports ISA Plug-and-Play functionality as indicated by Plug-and-Play (PnP) 122 in FIG. 2, and contains several logical devices. In the disclosed embodiment of the invention, the logical devices of interest for security purposes include the Real Time Clock (RTC) 112 (logical device 2), and Power Management (PM) logic 118 (logical device 8). The RTC 112 contains CMOS memory 114 locations where the power-on password and the administrator password of the disclosed embodiment of the invention are stored for provision to the slots 102 during power-up. The contents of the RTC 112 are maintained during power-down by an external battery. Access to these password locations is restricted to prevent the unauthorized reading or changing of a password. The PM logic 118 contains a Function Enable register 120 used to enable/disable several system hardware resources (devices) located within the Super I/O chip 62. These devices include the parallel port 64, the two serial ports 22, and other resources.

The ASIC 80 of the disclosed embodiment of the invention is capable of preventing read and/or write accesses to various registers of the Super I/O chip 62 by controlling the address enable input signal AEN and the I/O write control input signal IOWC# to the Super I/O chip 62. More specifically, security logic 108 within the ASIC 80 drives the address enable input signal AEN and the input/output write control input signal IOWC# of the Super I/O chip 62. In the disclosed embodiment of the invention, the Super I/O address enable signal SIOAEN and the Super I/O write control signal SIOWCL are selectively asserted by security logic 108 of the ASIC 80 to prevent the Super I/O chip 62 from decoding read and/or write cycles to the protected locations and select registers within the Super I/O chip 62 as set forth below.

In general, when the ASIC 80 detects an I/O read or I/O write cycle address to the Super I/O chip 62, the ASIC 80 may block the cycle with programmed security options. Specifically, if access to the particular Super I/O chip 62 resource being addressed has been locked, the current cycle will be blocked and not seen by the Super I/O chip 62. Control of the security logic 108 is described in greater detail below.

Due to the ISA Plug-and-Play capabilities 122 of the Super I/O chip 62, its base I/O address is programmable, as are the base 1,0 addresses of its logical devices. Several registers must therefore be secured to insure that the appropriate resources are protected. In the disclosed embodiment of the invention, these registers are secured through the use of Super I/O security registers 110 in the ASIC 80, as well as the aforementioned signal routing to the Super I/O chip 62 on the system board.

By using the security device 100 in conjunction with the security registers 116 of the Super I/O chip 62, a power-on password is protected by storing the current power-on password in slot "1" of the slots 102 and issuing a PROTECT RESOURCES command. Once slot 1 is loaded with a password and the PROTECT RESOURCES command is executed, it is not possible to read or write the power-on password at its pre-programmed location in the CMOS memory 114 of the Super I/O chip 62.

If slot 1 of the security device 100 has been placed in the PROTECT RESOURCES or PERMANENT LOCK state, and the last data write to the RTC 112 index register corresponds to the power-on password range, the Super I/O address enable signal SIOAEN is forced high for any read or write cycles directed to the data register (not shown) of the RTC 112. This functions to prevent the Super I/O chip 62 from responding to reads and writes to and from the power-on password storage area. When blocking all writes, the Super I/O write control signal SIOWC is manipulated in a similar fashion to the Super I/O address enable signal SIOAEN for blocking reads and writes.

The Flash ROM write protect signal FRWPL, when asserted by the security logic 108, protects the Flash ROM 78 from unauthorized write operations. The Flash ROM write protect signal FRWPL can only be asserted to protect the Flash ROM 78 if a password is stored in slot "0" of the slots 102 followed by a PROTECT RESOURCES or PERMANENTLY LOCK RESOURCES command for slot 0. The Flash ROM write protect signal FRWPL is not asserted following a hardware reset.

In the disclosed embodiment of the invention, the administrator password contained in slot 2 can be utilized to secure a variety of system resources, including: a hood lock register used to prevent unauthorized opening of the chassis of the computer system S, a secure GPIO register, and the various Super I/O chip 62 security registers 110. Further details of the operation of the administrator password as disclosed in the previously-incorporated U.S. patent application entitled "METHOD AND APPARATUS FOR PROVIDING REMOTE ACCESS TO SECURITY FEATURES ON A COMPUTER NETWORK".

As noted above, the Super I/O chip 62 of the disclosed embodiment of the invention incorporates numerous features, including Plug-and-Play capabilities 122. The Super I/O chip 62 utilizes an indexed addressing scheme, involving an Index and Data register pair, for its internal configuration registers. The initial I/O port locations of the Index and Data register pair are determined by hardware strapping at reset, and are set for 015Ch and 015Dh, respectively, in the disclosed embodiment of the invention, with full 16-bit decoding. The base addresses of the Index and Data register pair may be changed in software after reset through a 16-bit programmable register (see FIG. 3). The hardware strapping also indicates that the Super I/O chip 62 is in Plug and Play motherboard mode. The configuration registers are accessed by writing the appropriate logical device number at Index 07h, followed by writing the desired offset value to the Index register, and then reading or writing to the Data register.

Asic 80 Security Registers 110

This section describes in a tabular manner the Super I/O security registers 110 included in the ASIC 80 to implement the security mechanism described herein.

ASIC 80 Security Register Summary
System Management Registers

| Address | R/W | Description |
| --- | --- | --- |
| 0C50 | R/W | Index Register |
| 0C51 | R/W | Data Register |
| Address | 0C50 Index | |
| 0C51 | 80h | SIO Base Address MSB |
| 0C51 | 81h | SIO Base Address LSB |
| 0C51 | 82h | SIO Current Index Value |
| 0C51 | 83h | SIO Current Logical Device |
| 0C51 | 84h | SIO Blocking Control |
| 0C51 | 85h | SIO Blocked Index Value 0 |
| 0C51 | 86h | SIO Blocked Index Value 1 |
| 0C51 | 8Fh | Base Address Blocking Control |
| 0C51 | 90h | PM Logical Device |
| 0C51 | 91h | PM Base Address MSB |
| 0C51 | 92h | PM Base Address LSB |
| 0C51 | 93h | PM Current Index |
| 0C51 | 94h | PM Blocking Control |
| 0C51 | 95h | PM Blocked Index 0 |
| 0C51 | 96h | PM Blocked Index 1 |
| 0C51 | A0h | CMOS Logical Device |
| 0C51 | A1h | CMOS Base Addr MSB |
| 0C51 | A2h | CMOS Base Addr LSB |
| 0C51 | A3h | CMOS Current Index |
| 0C51 | A4h | CMOS Blocking Control |
| 0C51 | A5h | CMOS PoPW Low Index |
| 0C51 | A6h | CMOS PoPW High Index |
| 0C51 | A7h | CMOS AdmPW Low Index |
| 0C51 | A8h | CMOS AdmPW High Index |
| 0C51 | C0h | Security Control |

SUPER I/O BASE ADDRESS MSB: The base address of the Super I/O chip 62 is stored across two registers. The most significant byte of the address is stored in this 10 register. The least significant byte is stored in the Super I/O Base Address LSB register. The Super I/O Base Address must be aligned to a word (2 byte) boundary.

| Bit | Description |
|---|---|
| [7:0] | Most Significant Byte of the Super I/O Base Address Register. This byte represents bits [15:8] of the Super I/O Base Address register. |

SUPER I/O BASE ADDRESS LSB: The least significant byte of the address is stored in this register. The most significant byte is stored in the Super I/O Base Address MSB register.

| Bit | Description |
|---|---|
| [7:1] | Least Significant Byte of the Super I/O Base Address Register. This byte represents bits [7:1] of the Super I/O Base Address register. |
| 0 | Reserved. Return 0 on read. |
| | SUPER I/O CURRENT INDEX: |
| [7:0] | Current Value of the Super I/O Index register. This value is used for comparison with the Super I/O Block Index values. If blocking is enabled, when this value matches a Super I/O Blocked Index Value reads and/or writes to the Super I/O Data register are be blocked. |
| | SUPER I/O CURRENT LOGICAL DEVICE: |
| [7:0] | Current Logical Device. This byte holds the logical device being addressed in the Super I/O chip 62. This value is used to determine when the Power Management logical device 118 or the CMOS logical device (RTC 112) is being addressed. If this value matches the logical device number for Power Management logical device 118 or RTC 112, writes to Super I/O Indexes 60h, and 61h will be blocked. This will prevent a change to the I/O base address of the current logical device. |
| | SUPER I/O INDEX BLOCKING CONTROL: |
| [7:6] | Reserved. Return 0 on read. |
| [5] | Block Reads/Writes from SIO Blocked Index 1. When this bit is set to a '1,' the ASIC 80 will block both reads and writes to the Super I/O Data register if the Current Index value matches SIO Blocked Index 1. |
| [4] | Block Reads/Writes from SIO Blocked Index 0. When this bit is set to a '1,' the ASIC 80 will block both reads and writes to the Super I/O Data register if the Current Index value matches SIO Blocked Index 0. |
| [3:2] | Reserved. Return 0 on read. |
| [1] | Block Writes from SIO Blocked Index 1. When this bit is set to a '1,' the ASIC 80 will block writes to the Super I/O Data register if the Current Index value matches SIO Blocked Index 1. |
| [0] | Block Writes from the SIO Blocked Index 0. When this bit is set to a '1,' the ASIC 80 will block writes to the Super I/O Data register if the Current Index value matches SIO Blocked Index 0. |
| | SUPER I/O BLOCKED INDEX VALUE 0: |
| [7:0] | Super I/O Blocked Index Value 0. This value determines an Index of the Super I/O register space to which accesses can be blocked by ASIC 80. This Index is compared with the value of the Super I/O Current Index register to determine whether a read or write to a potentially blocked Index is occurring. If this register matches the Current Index value, and a read or write occurs to the Super I/O Data register, ASIC 80 will block the access if enabled via the Super I/O Blocked Index Control Register. |
| | SUPER I/O BLOCKED INDEX VALUE 1: |
| [7:0] | Super I/O Blocked Index Value 1. This value determines an Index of the Super I/O register space to which accesses can be blocked by ASIC 80. This Index is compared with the value of the Super I/O Current Index register to determine whether a read or write to a potentially blocked Index is occurring. If this register matches the Current Index value, and a read or write occurs to the Super I/O Data register, ASIC 80 will block the access if enabled via the Super I/O Blocked Index Control Register. |

-continued

| Bit | Description |
|---|---|
| | SUPER I/O BASE ADDRESS BLOCKING CONTROL: |
| [7] | Reserved. Return 0 on read. |
| [6] | Reads/writes to CMOS Base Address. When this bit is set to a '1,' ASIC 80 will block both reads and writes to the Super I/O Data register when/if the Current Index value is 60h or 61h, and the Current Logical device register matches the CMOS Logical Device Number register. This will prevent changes to the CMOS Base Address. |
| [5] | Block Reads/Writes to the Power Management Base Address. When this bit is set to a '1,' ASIC 80 will block both reads and writes to the Super I/O Data register when/if the Current Index value is 60h or 61h, and the Current Logical device register matches the PM Logical Device Number register. This will prevent changes to the Power Management Base Address. |
| [4] | Block Reads/Writes to Super I/O Base Address. When this bit is set to a '1,' ASIC 80 will block both reads and writes to the Super I/O Data register when/if the Current Index value is 22h. This will prevent changes to the Super I/O Base Address. |
| [3] | Reserved. Return 0 on read. |
| [2] | Block Reads/Writes to CMOS Base Address. When this bit is set to a ASIC 80 will block writes to the Super I/O Data register when/if the Current Index value is 60h or 61h, and the Current Logical device register matches the CMOS Logical Device Number register. This will prevent changes to the CMOS Base Address. |
| [1] | Block Reads/Writes to Power Management Base Address. When this bit is set to a '1,' ASIC 80 will block writes to the Super I/O Data register when/if the Current Index value is 60h or 61h, and the Current Logical device register matches the PM Logical Device Number register. This will prevent changes to the Power Management Base Address. |
| [0] | Block Read/Writes to Super I/O Base Address. When this bit is set to a '1,' ASIC 80 will block writes to the Super I/O Data register when/if the Current Index value is 22h. This will prevent changes to the Super I/O Base Address. |
| | POWER MANAGEMENT LOGICAL DEVICE NUMBER: |
| [7:0] | Power Management Logical Device Number. This register is programed with the value of the Power Management logical device number. Having this value allows ASIC 80 to block accesses (and therefore changes) to the Base Address of the Power Management logical device 118. |

POWER MANAGEMENT BASE ADDRESS MSB: The base address of the Power Management logical device 118 is stored across two registers. The most significant byte of the address is stored in this register. The least significant byte is stored in the Super I/O Base Address LSB register. The Super I/O Base Address must be aligned to a word (2 byte) boundary.

| Bit | Description |
|---|---|
| [7:0] | Most Significant Byte of the Power Management Base Address Register. This byte represents bits [15:8] of the Power Management Base Address Register. |

POWER MANAGEMENT BASE ADDRESS LSB: The least significant byte of the address is stored in this register. The most significant byte is stored in the Super I/O Base Address MSB register.

| Bit | Description |
|---|---|
| [7:1] | Least Significant Byte of the Power Management Base Address Register. This byte represents bits [7:1) of the |

-continued

| Bit | Description |
|---|---|
| | Power Management Base Address register. |
| 0 | Reserved. Return 0 on read. |

POWER MANAGEMENT CURRENT INDEX:

| Bit | Description |
|---|---|
| [7:0] | Current Value of the Power Management Index register. This value is used for comparison with the Power Management Blocked Index values. If blocking is enabled, when this value matches a Power Management Blocked Index Value reads and/or writes to the Power Management Data register will be blocked. |

POWER MANAGEMENT INDEX BLOCKING CONTROL:

| Bit | Description |
|---|---|
| [7:6] | Reserved. Return 0 on read. |
| [5] | Block Reads/Writes from PM Blocked Index 1. When this bit is set to a '1' ASIC 80 will block both reads and writes to the PM data register if the PM Current Index value matches the PM Blocked Index 1. |
| [4] | Block Reads/Writes from PM Blocked Index 0. When this bit is set to a '1' ASIC 80 will block both reads and writes to the PM data register if the PM Current Index value matches the PM Blocked Index 0. |
| [3:2] | Reserved. Return 0 on read. |
| [1] | Block Writes from PM Blocked Index 1. When this bit is set to a '1' ASIC 80 will block writes to the PM data register if the PM Current Index value matches PM Blocked Index 1. |
| [0] | Block Writes from PM Blocked Index 0. When this bit is set to a '1' ASIC 80 will block writes to the PM data register if the PM Current Index value matches PM Blocked Index 0. |

POWER MANAGEMENT BLOCKED INDEX 0:

| Bit | Description |
|---|---|
| [7:0] | Power Management Blocked Index Value 0. This value determines an Index of the PM register space to which accesses can be blocked by ASIC 80. This Index is compared with the value of the PM Current Index Register to determine whether a read or write to a potentially blocked Index is occurring. If this register matches the PM Current Index value and a read or write occurs to the PM data register, ASIC 80 will block the access if enabled via the PM Blocked Index Control Register. |

POWER MANAGEMENT BLOCKED INDEX 1:

| Bit | Description |
|---|---|
| [7:0] | Power Management Blocked Index Value O. This value determines an Index of the PM register space to which accesses can be blocked by ASIC 80. This Index is compared with the value of the PM Current Index Register to determine whether a read or write to a potentially blocked Index is occurring. If this register matches the PM Current Index value and a read or write occurs to the PM data register, ASIC 80 will block the access if enabled via the PM Blocked Index Control Register. |

CMOS LOGICAL DEVICE NUMBER:

| Bit | Description |
|---|---|
| [7:0] | CMOS Logical Device Number. This register is programmed with the value of the CMOS Logical Device Number. Having this value allows ASIC 80 to block accesses (and therefore changes) to the Base Address of the CMOS device. |

CMOS BASE ADDRESS MSB: The base address of the RTC 112 is stored across two registers. The most significant byte of the address is stored in this register. The least significant byte is stored in the CMOS Base Address LSB register. The CMOS Base Address must be aligned to a word (2 byte) boundary.

| Bit | Description |
|---|---|
| [7:0] | Most Significant Byte of the CMOS Base Address. This byte represents bits [15:8] of the CMOS Base Address Register. |

CMOS BASE ADDRESS LSB: The least significant byte of the address is stored in this register. The most significant byte is stored in the CMOS Base Address MSB register.

| Bit | Description |
|---|---|
| [7:1] | Least Significant Byte of the CMOS Base Address Register. This byte represents bits [7:1] of the CMOS Base Address Register. |
| 0 | Reserved. Return 0 on read. |

CMOS CURRENT INDEX:

| Bit | Description |
|---|---|
| [7:0] | Current Value of the CMOS Index Register. This value is used for comparison with the CMOS Blocked Password Ranges. If blocking is enabled, when the value falls within a Blocked Password Range, reads and/or writes to the CMOS Data Register will be blocked. |

CMOS INDEX BLOCKING CONTROL:

| Bit | Description |
|---|---|
| [7:6] | Reserved. Return 0 to read. |
| [5] | Reads/Writes from CMOS Administrator Password Index Range. When this bit is set to a '1,' ASIC 80 will block both reads and writes to the CMOS data register if the CMOS Current Index value falls within the Administrator Password Range. |
| [4] | Block Reads/Writes from CMOS Blocked Index 1. When this bit is set to a '1,' ASIC 80 will block both reads and writes to the CMOS data register if the CMOS Current Index value falls within the Power-On Password Range. |
| [3:2] | Reserved. Return 0 on read. |
| [1] | Block Reads/Writes from CMOS Administrator Password Index Range. When this bit is set to a '1,' ASIC 80 will block writes to the CMOS Data Register if the CMOS Current Index value falls within the Administrator Password Range. |
| [0] | Block Reads/Writes from CMOS Blocked Index 1. When this bit is set to a '1,' ASIC 80 will block writes to the CMOS Data Register if the CMOS Current Index value falls within the Power-On Password Range. |

CMOS POWER-ON PASSWORD LOW INDEX:

| Bit | Description |
|---|---|
| [7:0] | Lower Index of the Power-On Password. This register holds the low end of the range of indices used to store the Power-On password. The upper end of the range is stored in the Power-On Password High Index Register. When CMOS Blocking control enables blocking of this range, the value of the CMOS Current Index value is compared against this Low-to-High range. |

CMOS POWER-ON PASSWORD HIGH INDEX:

| Bit | Description |
|---|---|
| [7:0] | Upper Index of the Power-On Password. This register holds the high end of the range of indices used to store the Power-On password. The lower end of the range is stored in the Power-On Low Index register. When CMOS Blocking control enables blocking of this range, the value of the CMOS Current Index value is compared against this Low-to-High range. If the Current Index falls within the range, the cycle to the CMOS data register is blocked. |

CMOS ADMINISTRATOR PASSWORD LOW INDEX:

| Bit | Description |
|---|---|
| [7:0] | Lower Index of the Administrator Password. This register holds the low end of the range of indices used to store the Administrator password. The upper end of the range is stored in the Administrator Password High Index register. When CMOS Blocking control enables blocking of this range, the value of the CMOS Current Index value is compared against this Low-to-High range. If the Current Index falls within the range, the cycle to CMOS data register is blocked. |

CMOS ADMINISTRATOR PASSWORD HIGH INDEX:

| Bit | Description |
|---|---|
| [7:0] | Upper Index of the Administrator Password. This register holds the high end of the range of indices used to store the Administrator password. The lower end of the range is stored in the Administrator Password Low Index register. When CMOS Blocking Control enables blocking of this range, the value of the CMOS Current Index value is compared against this Low-to-High range. If the Current Index falls within the range, the cycle to the CMOS data register is blocked. |

SECURITY CONTROL: To write to this register, slot 2 (Administrator Password) of the security device 100 must be unlocked.

| Bit | Description |
| --- | --- |
| [7] | Full Proof Mode. This bit can be used to close a potential security hold in the ASIC 80 security scheme. When set to a '1' this bit will prevent an unlock of Slot 2 (Administrator Password) from clearing the Security Lock bit (bit 0 of this register) if password was NOT stored in Slot 2 at the time the Security Lock bit was set. Under normal operation (Full Proof Mode = '0'), the act of unlocking Slot 2 will clear the Security Lock bit. Clearing the Security Lock bit equates to an unsecured system because modifications can be made to the ASIC 80 security registers and therefore to the Super I/O registers. With no password in Slot 2, an unauthorized use could write a dummy password in Slot 2, issue a Protect Resources command, then issue an Access Resources command and unlock Slot 2. This would clear the Security Lock bit and render the system unsecured. Setting Full Proof Mode to '1' will prevent the clearing of Security Lock when there was not Slot 2 password loaded, thereby allowing the system to stay secure. When set to a '0', this bit allows the Security Lock bit to function normally. 1 = Prevent unlock of Slot 2 from clearing Security Lock bit (bit 0 of this register) if a password was not stored in Stoic when the, Security Lock bit was set. 0 = Security Lock bit (bit 0 of this register) functions normally. |
| [6:1] | Reserved. Return 0 to read. |
| [0] | Security Lock. This bit is used to lock ASIC 80's security system. Until this bit is set, all of the security related registers with ASIC 80 can be modified. The ability to modify these registers leaves the Super I/O chip 62 unprotected. Setting this bit to a '1' will prevent all writes to the ASIC 80 security registers. In addition, the base addresses of the Super I/O chip 62 and its logical devices will be protected if their protection is enabled via the Base Address Blocking Control register. To secure the system, this bit must be set to a '1' by software. Normally, the bit is cleared when Slot 2 of the security device 100 transitions from the locked state to the unlocked state. See the description of the Full Proof Mode bit for a more detailed description of the exception. 1 = ASIC 80 security is ON 0 = ASIC 80 security is OFF |

An exemplary security methodology utilizing theses register is described below in conjunction with FIGS. 4A and 4B.

Figure 3:
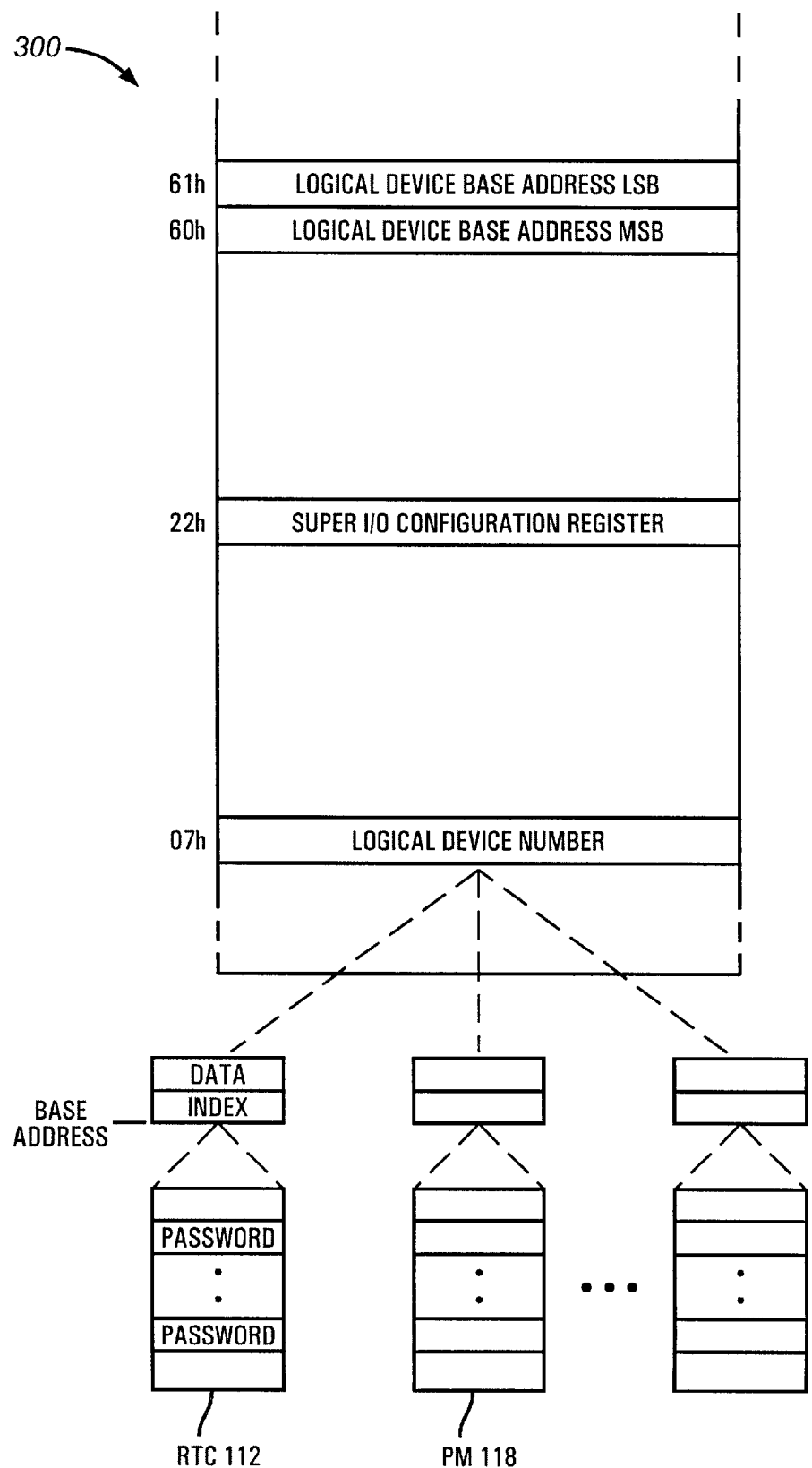
FIG. 3 is a diagram of various index register sets of a Super I/O chip.

Referring now to FIG. 3, a diagram of various registers of a Super I/O chip 62 utilized by the present invention is shown. The main index register set 300 of the Super I/O chip contains a number of indexes of interest in the disclosed embodiment. Only two system I/O addresses are required to access any of the configuration registers. Specifically, an Index and Data register pair 15 used to access registers for all read and write operations.

In a write operation, the target configuration register is identified, based on a value that is loaded into the Index register. Then, the data to be written into the configuration register is transferred via the Data register. Similarly, for a read operation, the source configuration register is identified, based on a value that is loaded into the Index register. The data to be read is then transferred via the Data register. Reading the Index register returns the last value loaded into the Index register. Reading the Data register returns the data in the configuration register pointed to by the Index register. Further details of the operation of these registers can be found in the specification for the National Semiconductor Corporation PC87307VUL device.

Of interest in the disclosed embodiment of the present invention, the index register value 07h specifies a logical device number; the index register value 22h references a Super I/O configuration register defining the base address of Super I/O chip 62; and index register values 60h and 61h reference the base address of a specified logical device. The base address of a logical device of the Super I/O chip 62 may be changed by selecting the logical device number via Index 07h, then programming the base address into indexes 60h and 61h.

In addition to protection of base addresses, the security logic 108 and security registers 110 according to the present invention also allow for protection of individual indexes for each of the protected logical devices. As illustrated, the Super I/O chip 62 provides a separate index register set for operation of each of the logical devices. Protection of individual indexes within these additional index register sets allows for specific functionality within each logic device to be protected.

For example, the nonvolatile RAM located in the RTC 112 is used for system password storage. The security logic provides programmable registers described above to designate ranges of the RTC index register space as protected ranges. These ranges may be used to store passwords such as an administrator password and a power-on password. When programmed with a base address of the RTC 112 (allowing for tracking of indexes as described above), the security logic 108 prevents accesses to these indexes when enabled. Likewise, the security logic 108 also provides the ability to protect indexes in the Power Management logical device 118.

Figure 4A:
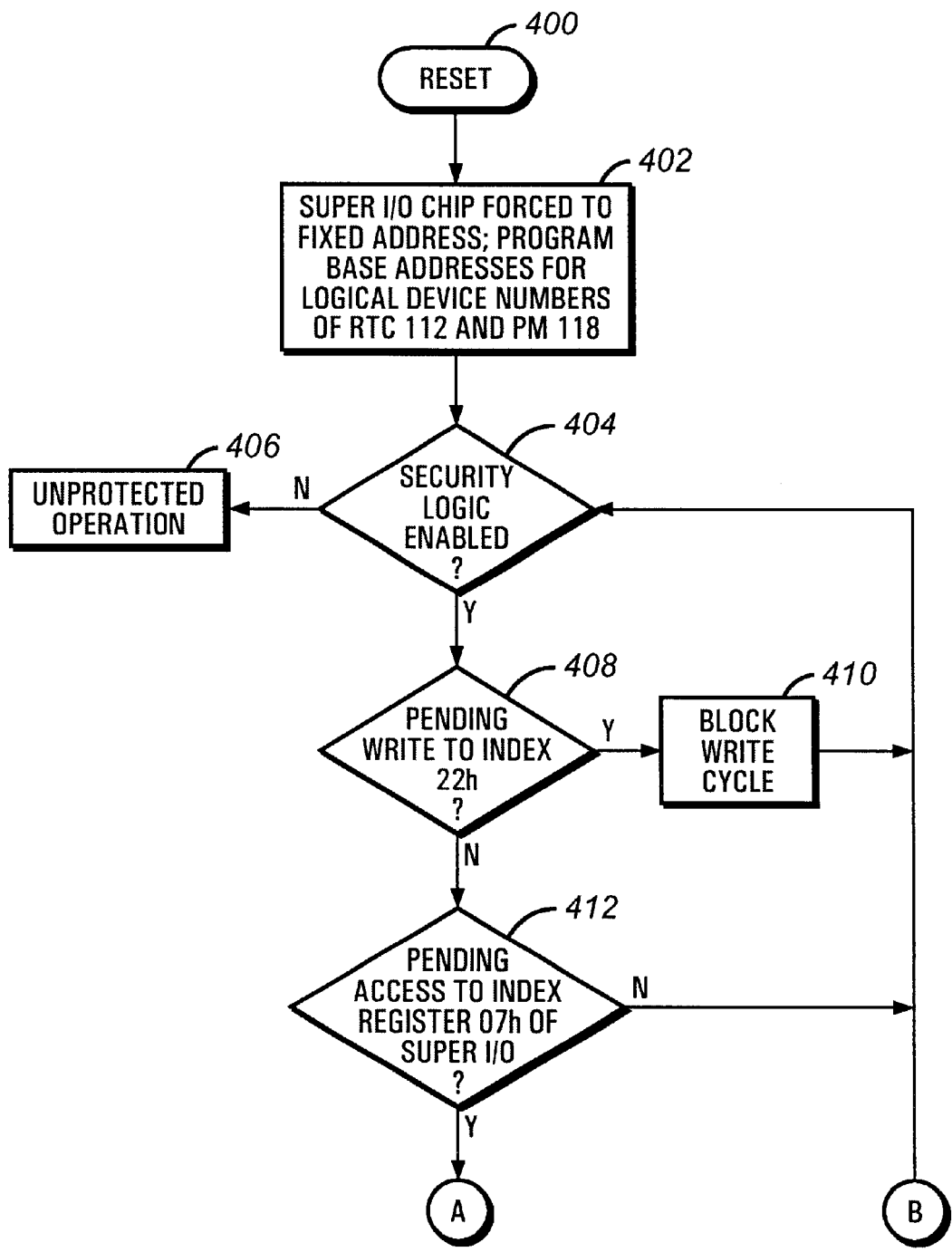
FIGS. 4A and 4B are flowchart diagrams of a security methodology according to the present invention.
Figure 4B:
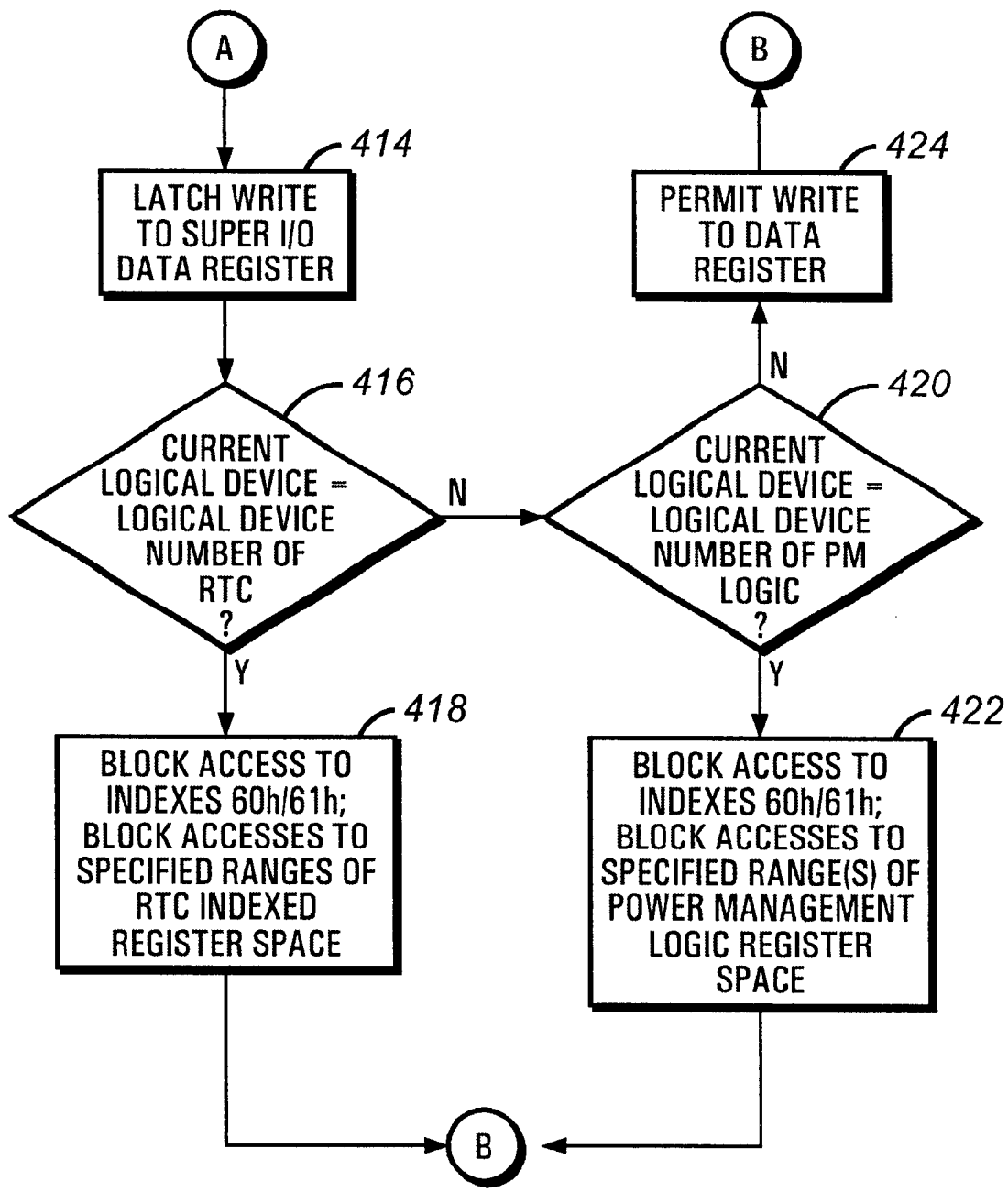

Referring now to FIGS. 4A and 4B, flowchart diagrams of an exemplary security methodology in accordance with the present invention is shown. The methodology commences in step 400 following reset of the computer system S. In step 402, a hardware strapping option on pins of the Super I/O chip 62 defines an address for the Index and Data registers. This prevents contention between the registers for I/O address space. It should be noted that the base address is for the Index and Data registers of the Super I/O chip 62 are essentially the base address of the main index register set of the Super I/O chip 62. Also in step 402, the base addresses for logical device numbers for RTC 112 and the Power Management logic 118 are programmed into the Super I/O security register 110 as described above.

Next, in step 404, the state of the security logic 108 and the security device 100 are set. In the disclosed embodiment of invention, the slots 102 of the security device 100 are utilized to enable access to the secured features of the Super I/O chip 62. If the security logic 108 is not enabled as determined in step 404, control proceeds to step 406 and operation of the computer system S proceeds in a manner which allows for unprotected access to the configuration registers and other secured resources of the Super I/O chip 62.

If the security logic 108 is enabled is provided for in step 404, control passes to step 408 where pending writes to the main index register set of the Super I/O chip 62 are examined for a pending write to Index 22h, which is a Super I/O chip 62 configuration register that allows the base address of the Super I/O chip to be modified. If the pending write is to Index 22h in the Super I/O chip register space, the pending write cycle is blocked by the security logic 108 in step 44. Again, the base address of the Super I/O chip 62 as well as the current Index value of the pending write is stored in the security registers 110 as described above. The security logic 108 tracks the current Super I/O chip 62 Index by decoding the Super I/O chip 62 base address (Index register).

If the pending write cycle to the Super I/O chip 62 is not to Index 22h as determined in step 408, control proceeds to step 412 where it is determined if the pending access is to Super I/O chip 62 Index 07h (note that the precise ordering of steps 408 and 412 is not consider critical to the invention). If 07h is not in the Index register as determined by the security logic 108 in step 412, control returns to step 404, which is also where control proceeds following step 410.

If it is determined in step 412 that an access to Index register 07h is pending, control proceeds to step 414 (FIG. 4B) where the security logic 108 latches writes to the Data register of the Super I/O chip 62. Since the base address of a logical device of the Super I/O chip 62 may be changed by selecting the logical device number via Index 07h, then programming the base address into Indexes 60–61h, protection of these indexed locations is desirable when the base address of a specified logical device is to be protected.

Next, in step 416, it is determine whether the current logical device equals the programmable logical device number of the RTC 112. If so, control proceeds to step 418 where all accesses to Indexes 60–61h are blocked. In addition, accesses to specified ranges of the CMOS memory 114 of the RTC 112 index register space are blocked. As noted above, in the disclosed embodiment of the invention, programmable registers designating ranges of index register space of the RTC 112 to be protected are provided. These ranges may be used, for example, to store the Administrator Password and the Power-On Password. Thus, when programmed with the base address of the RTC 112 (to permit tracking of the Indexes as described above), the security logic 108 prevents access to specified ranges when enabled.

If the current logical device does not equal the logical device number of the RTC 112 as determined in step 416, control passes to step 420 to determine if the current logical device equals the logical device number of the Power Management logical device 118. If so, control passes to step 422, where access is to Indexes 60–61h are blocked. In addition, the disclosed security logic 108 also provides the ability to protect two indexes in the Power Management logical device 118. One of the protected Power Management indexes contains a function enable register 120. This register allows a user to enable/disable all of the data transfer devices in the Super I/O chip 62. These devices include a floppy controller, the parallel port 64, the serial ports 72, and the infrared port 66. Accesses to other indexes of the Power Management logic 118 may also be blocked in step 422.

If the current logical device does not equal the logical device number of the Power Management logical device 118 as determined in step 420, control proceeds to step 424 and the write(s) to the Data register is allowed to proceed. Following any of steps 418, 422 or 424, control loops to step 404. Again, the precise ordering of steps 416–424 is not considered critical to the invention.

Referring now to FIGS. 5A–5E, schematic diagrams of details of portions of the security logic 108 for providing security functions in accordance with the present invention are shown. Beginning with FIG. 5A, exemplary logic for generating the Super I/O address enable signal SIOAEN and the Super I/O write control signal SIOWCL is shown. The Super I/O address enable signal SIOAEN is driven by the output of a four-input OR gate 500. The inputs of the OR gate 500 are driven by an address enable signal AEN, as well as the outputs of AND gates 502, 506 and 508. The inputs of the AND gate 502 are driven by bit zero of the Security Control Register as well as the output of an OR gate 504. The inputs of the OR gate 504 are generated by the logic of FIGS. 5B–5E. The input of the AND gate 506 receives a power on password unlock signal POP_UNLOCK_ as well as a blocking signal generated by the logic of FIG. 5E. Similarly, the AND gate 504 receives an administrator unlock signal ADM_UNLOCK_ and a blocking signal generated by the logic of FIG. 5E. Thus, a number of conditions, defined largely by the contents of the registers described above and the address on the data bus, may cause assertion of the Super I/O address enable signal SIOAEN.

The Super I/O write control signal SIOWCL is provided by the output of a four input OR gate 510. One input of the OR gate 510 is driven by an 1O write control signal IOWC# while the remaining inputs are driven by AND gates 512, 516, and 518. The Super I/O write control signal SIOWCL is asserted following assertion of any of the inputs of the OR gate 510. The output of AND gate 512 is asserted if bit zero of the Security Control Register is asserted, as well as the output of a three input OR gate 514. The inputs of the OR gate 514 are generated by the logic described in FIGS. 5B–5E. The AND gate 516 receives a power on password unlock signal POP_UNLOCK_ as well as a blocking signal generated by the logic of FIG. 5E. Similarly, the inputs of AND gate 518 are driven by the administrator unlock signal ADM_UNLOCK, as well as a blocking signal generated by the logic of FIG. 5E. Thus, the Super I/O write control signal SIOWCL is also asserted under a variety of security states.

Figure 5A:
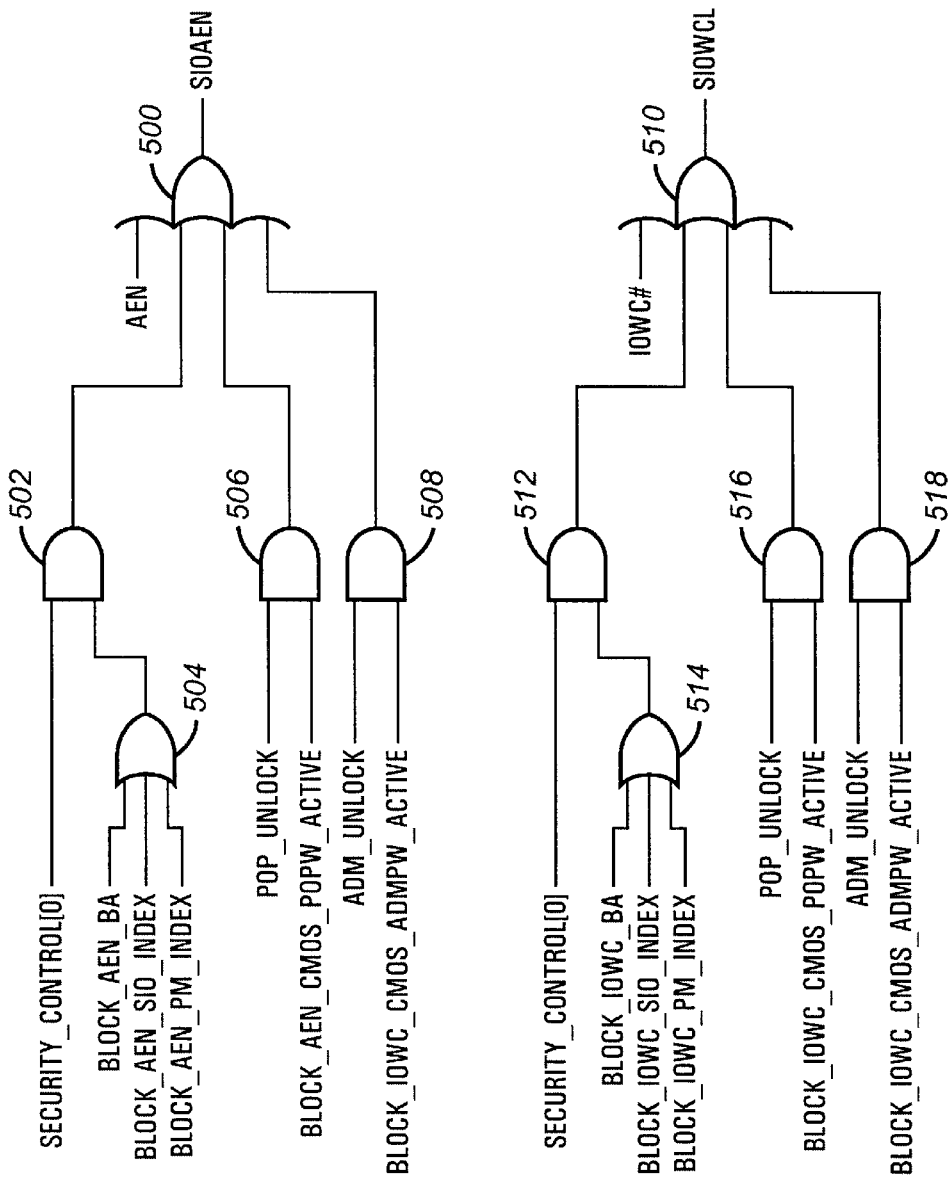
FIGS. 5A–5E are schematic diagrams of security logic for providing security functions in accordance with the present invention.
Figure 5B:
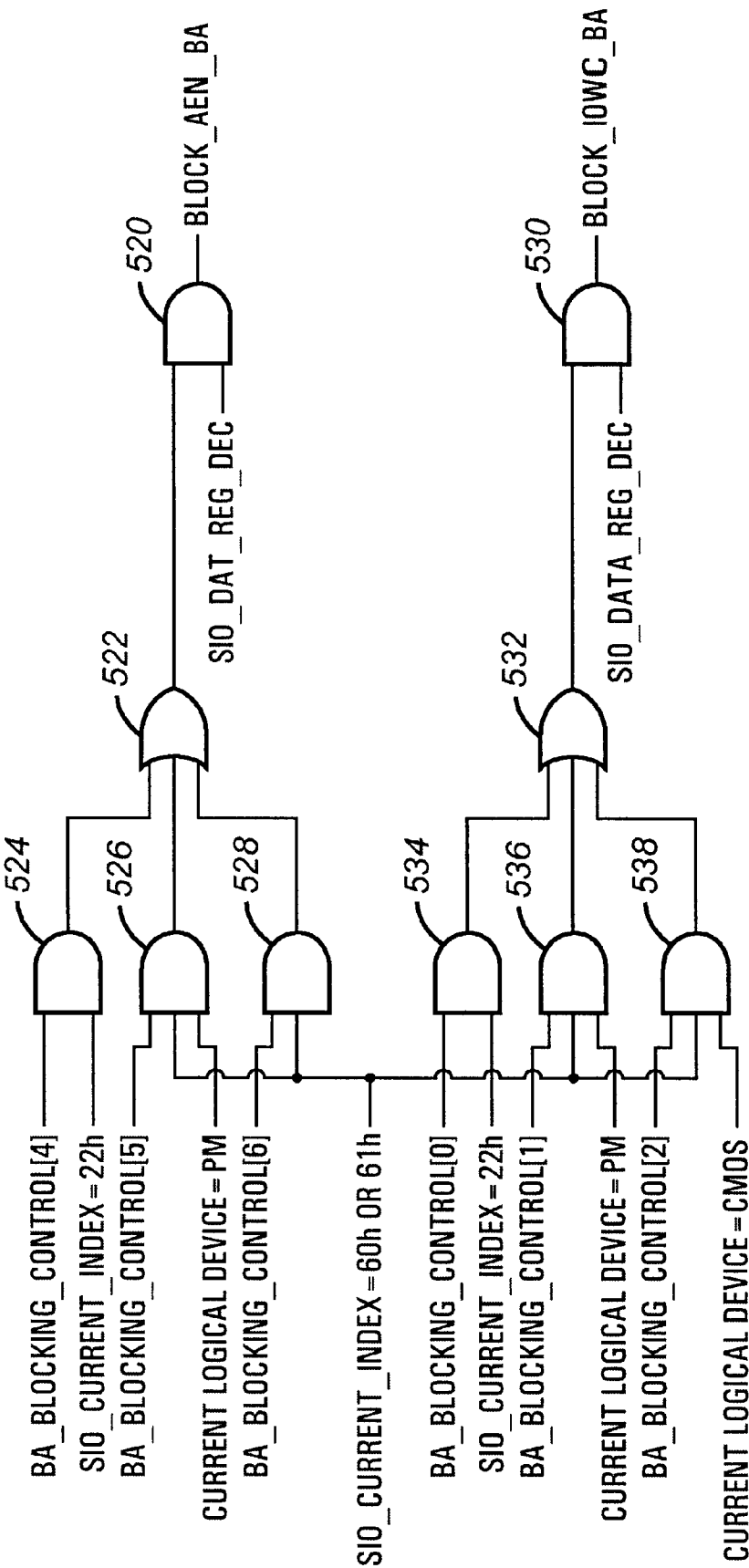

Referring now to FIG. 5B, a blocking address enable signal BLOCK_EAN_BA used by the logic of FIG. 5A is provided by the output of an AND gate 520. One input of the AND gate 520 is driven by a Super I/O data register decode signal SIO_DAT_REG DEC FIG. 5C), while the other input is provided by the output of a three input OR gate 522. Inputs to the OR gate 522 include the outputs of AND gates 524, 526, and 528. Inputs of the AND gate 524 are driven by bit four of the Base Address Blocking Control register described above. When this bit is asserted, the ASIC 80 will block both reads and writes to the Super I/O Data register. This bit is logically AND'ed with a signal asserted when the Super I/O Current Index is 22h.

The inputs to the AND gate 526 include bit five of the Super I/O Base Address Blocking Control register (blocks both reads and writes to the Super I/O Data register when asserted); a signal asserted when the Super I/O Current Index is 60h or 61h; and a signal asserted when the current logical device is the power management logical device 118. The output of AND gate 528 is asserted when bit six of the Super I/O Base Address Blocking Control register is asserted; the Super I/O Current Index register has a value of 60h or 61h; and the Current Logical Device corresponds to the CMOS or RTC 112. Thus, the block address enable signal BLOCK_EAN_BA will prevent the Super I/O address enable signal SIOAEN from being asserted when the condition specified by the registers described above are met.

The block signal BLOCK_IOWC_BA used by OR gate 514 of FIG. 5A is provided by the output of an AND gate 530. One input of the AND gate 530 receives the Super I/O Data register decode signal SIO_DATA_REG_DEC FIG. 5C). The other input of the AND date 530 is driven by the output of a three input OR gate 532, whose inputs include the outputs of AND gates 534, 536, and 538. The output of AND gate 534 is asserted when bit zero of the Super I/O Base Address Blocking Control register is set and the SIO Current Index is 22h. The output of the AND gate 536 is asserted when bit one of the Super I/O Base Address Blocking Control register is set; a Super I/O Current Index register has a value of 60h or 61h; and the Current Logical Device corresponds to the Power Management logical device 118. The output of the AND gate 538 is asserted when two of the Super I/O Base Address Blocking Control register is set; the SIO Current Index value is 60h or 61h; and the Current Logical Device corresponds to the CMOS or RTC 112. Assertion of the block I/O write control base address signal BLOCK_IOWC_BA blocks writes to the Super I/O Data register when the Super I/O Data register decode signal SIO DATA_REG_DEC is asserted and one of the outputs of the AND gates 534–538 is asserted.

Figure 5C:
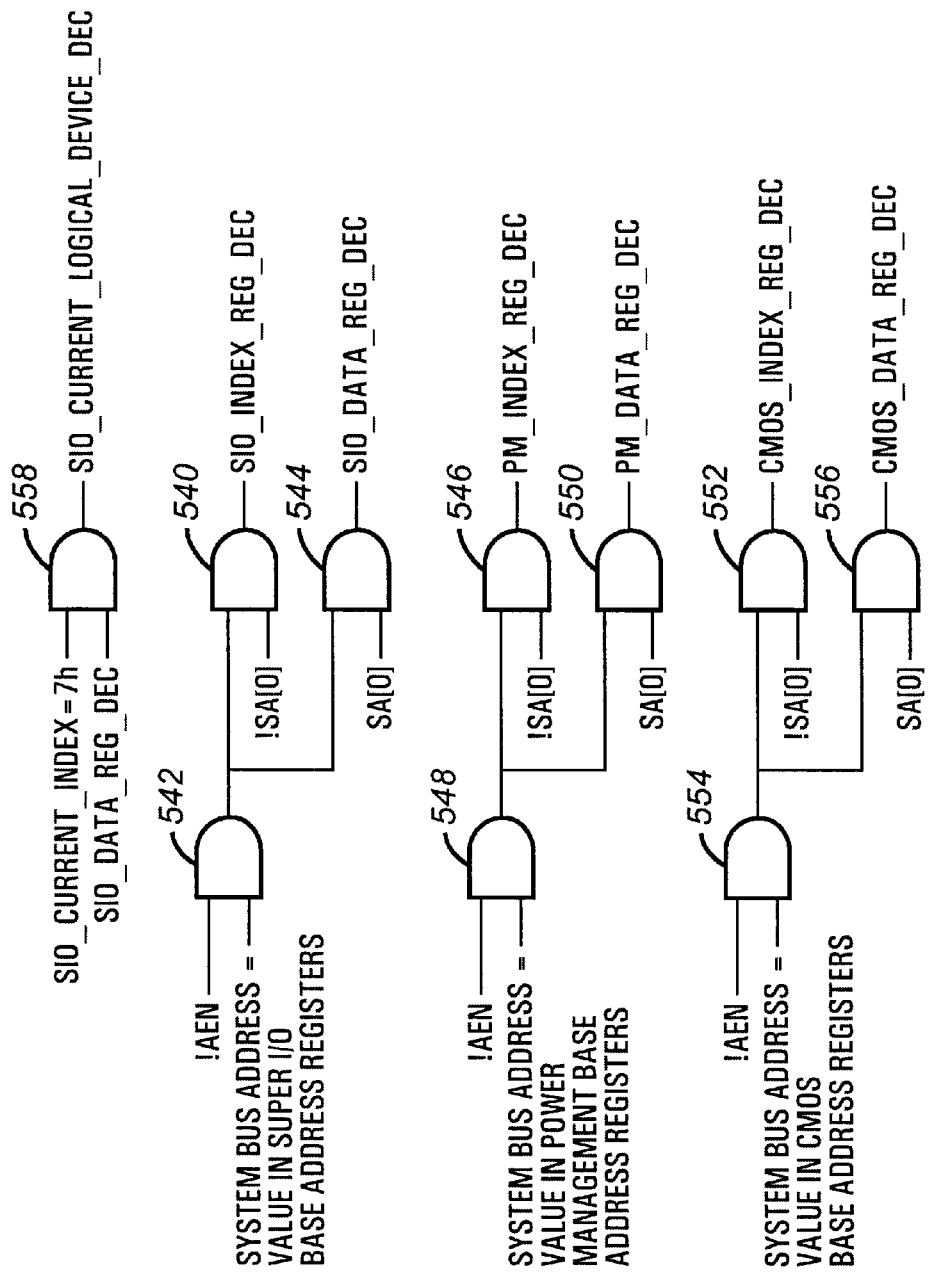

Referring now to FIG. 5C, logic is shown for generating various decode signals indicating when various registers are addressed by the system. The Super I/O INDEX register decode signal SIO_INDEX_REG_DEC is driven by the output of an AND gate 540. This output is asserted when the least significant bit of the system address bus is set to a value of zero (i.e., no offset), and the output of an AND gate 542 is asserted. The output of the AND gate 542 is asserted when the address enable signal AEN is deasserted and the system bus address is equal to the value programmed in the Super I/O Base Address registers.

The Super I/O Data register decode signal SIO_DAT_REG_DEC is driven by the output of an AND gate 544. This signal is asserted when the least significant bit of the system address bus is asserted Indicating an offset to the Data register) while the output of the AND gate 542 is asserted.

The power management index register decode signal PM_INDEX_REG_DEC and the Power Management data register decode signal PM_DATA_REG_DEC are generated in a similar manner by AND gates 546, 548, and 550. These signals become active when the system bus address is equal to the value programmed in the Power Management Base Address registers.

The CMOS index register decode signal CMOS_INDEX_REG_DEC and the CMOS data register decode signal CMOS_DATA_REG_DEC are also generated in a similar manner. Assertion of these signals is enabled when the system bus address is equal to the value(s) programmed in the CMOS Base Address register as described above.

A Super I/O current logical device decode signal SIO_CURRENT_LOGICAL_DEVICE_DEC is provided by the output of an AND gate 558. This signal is asserted when the Super I/O Current Index value is set to 07h and the Super I/O Data register decode signal SIO_DATA_REG_DEC is asserted.

Figure 5D:
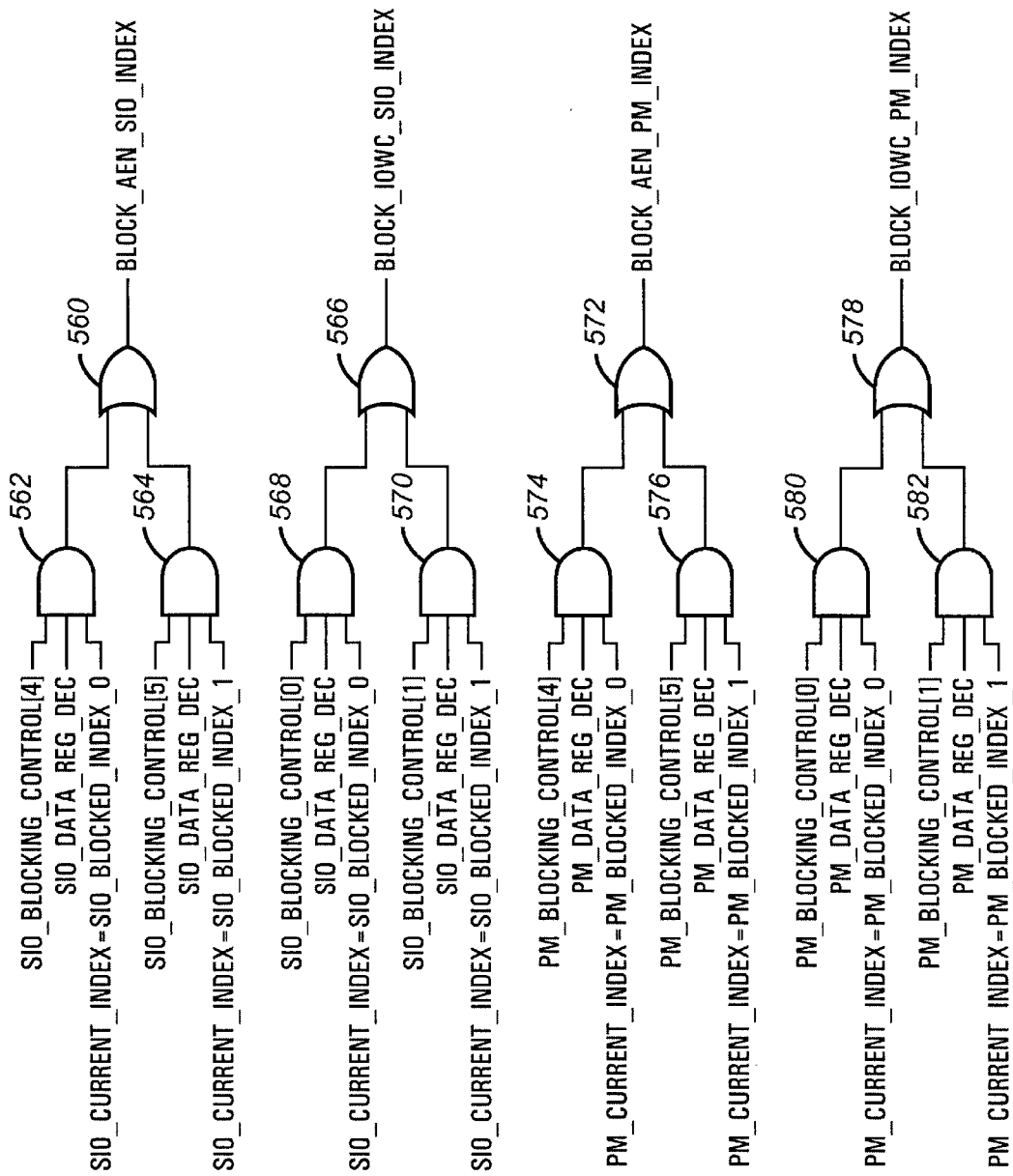

Referring now to FIG. 5D, logic for generating various blocking signals utilized by the logic of FIG. 5A is shown. Specifically, a block address enable Super I/O index signal BLOCK_AEN_SIO_INDEX is provided by the output of an OR gate 560, whose inputs are driven by AND gates 562 and 564. The inputs to AND gate 562 and 564 include the Super I/O Data register decode signal SIO DATA_REG_DEC and a signal asserted when the Super I/O, Current Index value equals the value programmed in the SIO Blocked Index Value 0 register. In addition, bit four of the Super I/O Index Blocking Control register is provided as an input to the AND gate 562, while bit five of this register is provided to an input of the AND gate 564. Assertion of the block address enable Super I/O index signal BLOCK_AEN_SI_INDEX allows the ASIC 80 to block both reads and writes to the Super I/O Data register under the aforementioned conditions.

The block input output write control Super I/O index signal BLOCK_IOWC_SIO_INDEX signal is generated in a similar manner by OR gate 566 and AND gates 568 and 570. Specifically, bits 0 and 1 of the Super I/O Index Blocking Control register are provided to the AND gates 568 and 570, respectively. When asserted, the block I/O write control Super I/O index signal BLOCK_IOWC_SIO_INDEX allows the ASIC 80 to block writes to the Super I/O Data register under the specified conditions.

The block address enable power management index signal BLOCK_AEN_PM_INDEX is provided by the output of the OR gate 572, whose inputs are driven by the outputs of AND gates 574 and 576. Inputs to the AND gate 574 include bit 4 of the Power Management Index Blocking Control register. When asserted, this bit will allow the ASIC 80 to block both reads and writes to the aforementioned Power Management Current Index Value. Bit 5 of the Power Management Index Blocking Control register is provided to the AND gate 576. When asserted, this bit allows the ASIC 80 to block both reads and writes to the Power Management Data register, if the Power Management Current Index register value matches the Power Management Blocked Index 1 register value. The power management Data register decode signal PM_DATA_REG_DEC is also provided as an input to each of the AND gates 574 and 576.

The block I/O write control power management index signal BLOCK_IOWC_PM_INDEX is provided by the output of an OR gate 578, whose inputs are driven by the outputs of AND gates 580 and 582. Inputs to the AND gates 580 and 582 are the same as those described above for AND gates 574 and 576, with the exception that bit 0 of the Power Management Index Blocking Control register is provided as an input to AND gate 580, while bit 1 of this register is provided as an input to AND gate 582. Assertion of the block I/O write control power management index signal BLOCK_IOWC_PM_INDEX allows the ASIC 80 block writes to the Power Management Data register under the specified conditions.

Figure 5E:
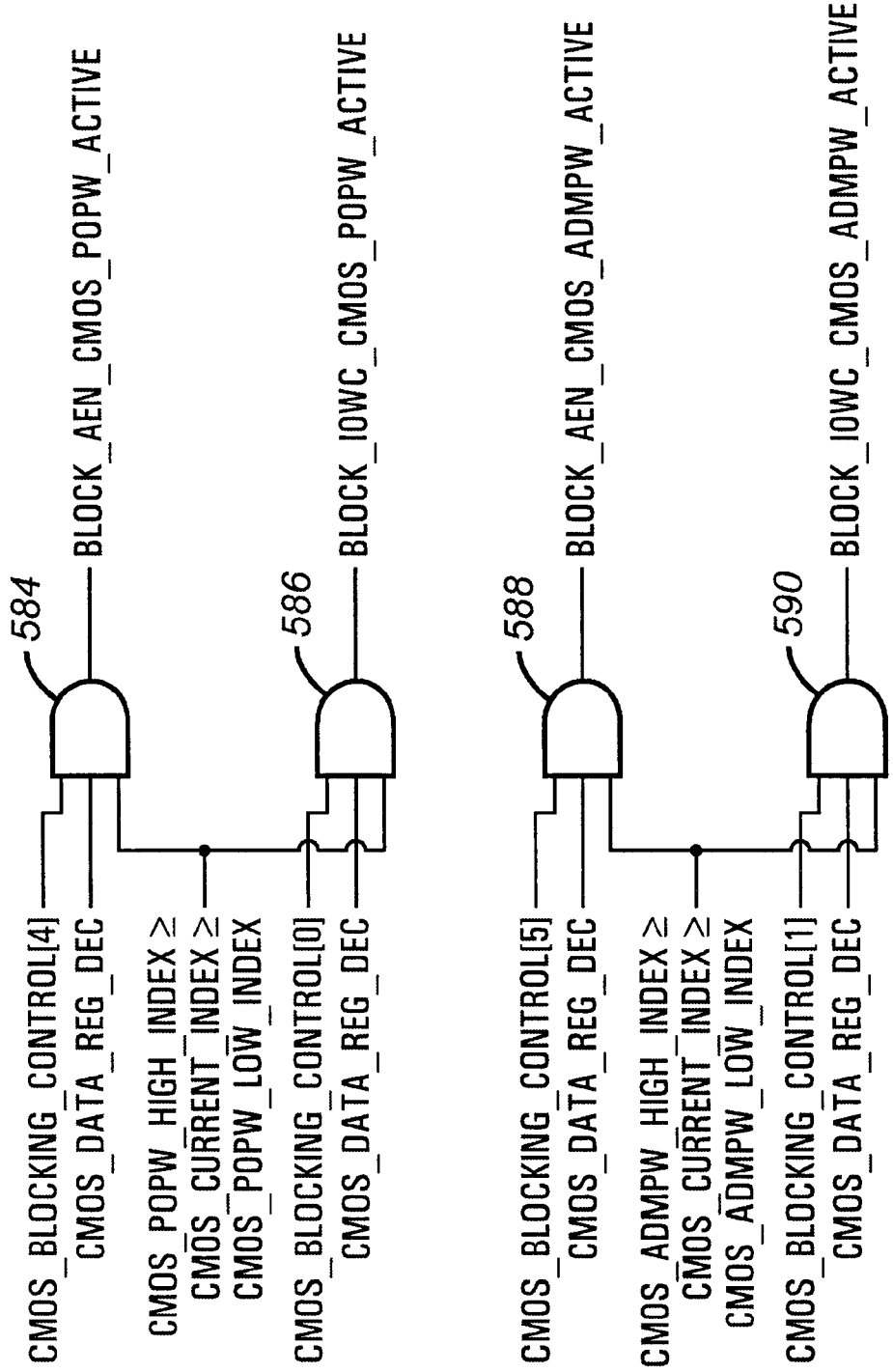

Referring now to FIG. 5E, generation of additional blocking signals for use by the logic of FIG. 5A is shown. Specifically, a block address enable CMOS power-on password active signal BLOCK_AEN_CMOS_POPW_ACTIVE is provided by the output of an AND gate 584. Inputs to this AND gate 584 include bit 4 of the CMOS Index Blocking Control register described above. Bit 0 of this register is an input to the AND gate 586. Both of the AND gates 584 and 586 also have inputs driven by the CMOS Data register decode signal CMOS_DATA_REG_DEC, as well as a signal that is asserted when the CMOS Current Index value is within the range specified by the CMOS Power-On Password Low Index and CMOS Power-On Password High Index registers. The output of AND gate 586 provides the block I/O write control CMOS power-on password active signal BLOCK_IOWC_CMOS_ADMPW_ACTIVE. Assertion of either the outputs of either AND gates 584 or 586 allows the ASIC 80 to block writes to the CMOS Data register if the CMOS Current Index value falls within these specified ranges A block address enables CMOS administrator password active signal BLOCK_AEN_CMOS_ADMPW_ACTIVE and a block I/O write control CMOS administrator password active signal BLOCK_IOWC_CMOS_ADMPW_ACTIVE are provided by the outputs of AND gates 588 and 590, respectively. Inputs to both of these AND gates 588 and 590 include the CMOS Data register decode signal CMOSDATA_REG_DEC and a signal asserted when the CMOS Current Index value is within the range specified by the CMOS Administrator Password High Index and CMOS Administrator Password Low Index registers. Bit 5 of the CMOS Index Blocking Control register is also provided as an input to the AND gate 588, while bit 1 of this register is provided as an input to the AND gate 590. Assertion of the outputs of the AND gates 588 and 590 allow the ASIC 80 to prevent reads and/or writes to the portions of the RTC 112 containing the administrator password.

Thus, a security methodology and security logic for protecting Plug and Play computer system components from unauthorized access has been described. The security logic prevents access to specific index registers corresponding to logical devices. In addition, the security logic of the disclosed embodiment of the invention also protects the base addresses of a Super I/O chip, as well as the base addresses of specified logical devices. Protecting the base addresses in this manner prevents the security logic from being circumvented by interfering with the address decoding used to track reads and writes to protected index registers.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A security device for providing secure access to specified features of a plug and play compatible device having an index register set accessible at a base address, the index register set providing a base address index location for modifying the base address of the plug and play compatible device, the security device comprising:
    a security register(s) for storing a value corresponding to the base address index location of the index register set of the plug and play compatible device; and
    security logic configurable to block access to index locations in the security device used for changing the base address of the plug and play compatible device when a bus cycle is pending to the base address index location stored in the security register(s).

2. The security device of claim 1, the plug and play compatible device further including at least one logical device, the index register set providing an additional index location(s) for designating the base address of the at least one logical device, the security device further comprising:
    an additional security register(s) for storing a value(s) corresponding to the base address index location of the at least one logical device,
    wherein the security logic is further configurable to block access to the plug and play compatible device when a bus cycle is pending to the base address index location of the at least one logical device as reflected by the value(s) stored in the additional security register(s).

3. The security device of claim 2, the plug and play compatible device further including a separate index and data register pair for the at least one logical device, the separate index register providing an additional index location(s) for accessing resources of the at least one logical device, the security device further comprising:
    an additional security register(s) for specifying an index location(s) of the index register of the at least one logical device,
    wherein the security logic is further configurable to block access to the plug and play compatible device when a bus cycle is pending to the specified index register of the at least one logical device as reflected by the value(s) stored in the additional security register(s).

4. The security device of claim 3, wherein the at least one logical device is a real time clock (RTC).

5. The security device of claim 4, wherein the specified index value(s) correspond to a password(s).

6. The security device of claim 3, wherein the at least one logical device includes power management logic capable of disabling specified computer system components.

7. The security device of claim 2, wherein the security logic is configurable to block access to the plug and play compatible device through provision of an address enable signal to the plug and play compatible device.

8. The security device of claim 2, wherein the security logic is configurable to block access to the plug and play compatible device through provision of an input/output write control signal to the plug and play compatible device.

9. The security device of claim 1, further comprising:
    a memory slot for securely storing a password;
    a register for receiving user key information; and
    comparator logic coupled to the memory slot and the register, the comparator logic asserting an enable signal if the user key information matches the password, wherein the security logic is enabled/disabled in response to the enable signal.

10. A computer system, comprising:
    a system bus;
    a processor coupled to the system bus;
    a data input device coupled to the system bus for allowing a user to input data;
    a plug and play compatible device coupled to the system bus, the plug and play compatible device having an index register set accessible at a base address, the index register set including a base address index location for modifying the base address of the plug and play compatible device;
    a security device coupled to the plug and play compatible device for providing secure access to specified features of the plug and play compatible device, the security device comprising:
        a security register(s) for storing a value corresponding to the base address index location of the index register set of the plug and play compatible device; and
        security logic configurable to block access to index locations in the security device used for changing the base address of the plug and play compatible device when a system bus cycle is pending to the base address index location stored in the security register(s).

11. The computer system of claim 10, the plug and play compatible device further comprising:
    at least one logical device, the index register set providing an additional index location(s) for designating the base address of the at least one logical device; and the security device further comprising:
    an additional security register(s) for storing a value(s) corresponding to the base address index location of the at least one logical device,
    wherein the security logic is further configurable to block access to the plug and play compatible device when a bus cycle is pending to the base address index location of the at least one logical device as reflected by the value(s) stored in the additional security register(s).

12. The computer system of claim 11, the plug and play compatible device further comprising:
    a separate index and data register pair for the at least one logical device, the separate index register providing index location(s) for accessing resources of the at least one logical device; and
    the security device further comprising:
    an additional security register(s) for specifying an index location(s) of the index register of the at least one logical device, wherein the security logic is further configurable to block access to the plug and play compatible device when a bus cycle is pending to the specified index register of the at least one logical device as reflected by the value(s) stored in the additional security register(s).

13. The computer system of claim 12, wherein the at least one logical device is a real time clock (RTC).

14. The computer system of claim 13, wherein the specified index value(s) correspond to a password location.

15. The computer system of claim 12, wherein the at least one logical device includes power management logic capable of disabling specified computer system components.

16. The computer system of claim 11, wherein the security logic and the plug and play compatible device are coupled by an address enable signal, and wherein the security logic is configurable to block access to the plug and play compatible device through assertion/deassertion of the address enable signal.

17. The computer system of claim 11, wherein the security logic and the plug and play compatible device are coupled by an input/output write control signal, and wherein the security logic is configurable to block access to the plug and play compatible device through assertion/deassertion of the an input/output write control signal.

18. The computer system of claim 10, the security device further comprising:

a memory slot for securely storing a password;

a register for receiving user key information from the data input device; and comparator logic coupled to the memory slot and the register, the comparator logic asserting an enable signal if the user key information matches the password, wherein the security logic is enabled/disabled in response to the state of the enable signal.

19. A method, using a security device, for providing secure access to specified features of a plug and play compatible device having an index register set accessible at a base address, the index register set providing a base address index location for modifying the base address of the plug and play compatible device, the method comprising the steps of:

storing, in a security register, a value corresponding to the base address index location of the index register set of the plug and play compatible device; and blocking access to index locations in the security device used for changing the base address of the plug and play compatible device when a bus cycle is pending to the base address index location stored in the security register.

20. The method of claim 19, wherein the plug and play compatible device further comprises at least one logical device having a base address capable of being modified via a logical device base address index register(s) of the index register set, further comprising the steps of:

storing, in additional security registers, values corresponding to the logical device base address index location of the index register set for the logical device;

blocking access to the plug and play compatible device when a bus cycle is pending to the logical device base address index location stored in the security register.

21. The method of claim 20, wherein the plug and play compatible device further comprises a separate index and data register pair for the at least one logical device, the separate index register proving an additional index location (s) for accessing resources of the at least one logical device, the method further comprising the steps of:

storing, in additional security registers, values corresponding to index value(s) of the index register of the at least one logical device;

blocking access to the plug and play compatible device when a bus cycle is pending to the stored index values of the index register of the at least one logical device.

22. The method of claim 21, wherein the at least one logical device is a real time clock (RTC).

23. The method of claim 22, wherein the stored index values of the index register of the real time clock (RTC) correspond to stored password locations.

24. The method of claim 21, wherein the at least one logical device comprises power management logic capable of disabling specified computer system components.

25. The method of claim 21, further comprising the step of:

enabling/disabling blocking of access to stored index values of the index register via a user-supplied password.

* * * * *

UNITED STATES PATENT AND TRADEMARK OFFICE
CERTIFICATE OF CORRECTION

PATENT NO.     : 6,301,665 B1
DATED          : October 9, 2001
INVENTOR(S)    : Christopher E. Simonich et al.

It is certified that error appears in the above-identified patent and that said Letters Patent is hereby corrected as shown below:

Column 2,
Line 52, the sentence starting "Adding Plug and Play" should start a new paragraph.

Column 13,
Line 47, after "pair" delete "15" and insert therefor -- is --.

Column 14,
Line 58, after "step" delete "44" and insert therefor -- 414 --.

Signed and Sealed this

Twenty-ninth Day of November, 2005

JON W. DUDAS
*Director of the United States Patent and Trademark Office*